United States Patent
Jacquet

(10) Patent No.: US 6,944,102 B2
(45) Date of Patent: Sep. 13, 2005

(54) MAGNETO-OPTICAL READER WHICH IS OPTIMIZED BY THE INCIDENT-LIGHT POLARISER

(75) Inventor: Jean-Claude Jacquet, Orsay (FR)

(73) Assignee: Thales, Paris (FR)

( * ) Notice: Subject to any disclaimer, the term of this patent is extended or adjusted under 35 U.S.C. 154(b) by 337 days.

(21) Appl. No.: 10/149,788

(22) PCT Filed: Dec. 12, 2000

(86) PCT No.: PCT/FR00/03485

§ 371 (c)(1),
(2), (4) Date: Oct. 8, 2002

(87) PCT Pub. No.: WO01/45099

PCT Pub. Date: Jun. 21, 2001

(65) Prior Publication Data

US 2004/0042700 A1 Mar. 4, 2004

(30) Foreign Application Priority Data

Dec. 17, 1999 (FR) .............................. 99 15987

(51) Int. Cl.[7] .............................................. G11B 11/00
(52) U.S. Cl. ...................................................... 369/13.3
(58) Field of Search ......................... 365/122; 369/13.3, 369/13.29, 13.31, 13.32, 112.01, 110.01, 110.04; 360/114.01, 114.02, 114.04, 114.09

(56) References Cited

U.S. PATENT DOCUMENTS 3,636,535 A * 1/1972 Cushner et al. ........ 360/114.08
4,228,473 A * 10/1980 Himuro et al. ........ 360/114.08
4,586,092 A * 4/1986 Martens et al. .......... 369/13.38
4,654,837 A * 3/1987 Browder .................. 369/13.29
4,918,675 A * 4/1990 Lee .......................... 369/13.29
5,007,021 A * 4/1991 Hattori ...................... 369/13.3
5,099,470 A * 3/1992 Matsubayashi .......... 369/13.31
5,124,868 A * 6/1992 Matsubayashi et al. .. 369/13.32
5,528,576 A    6/1996 Nishikawa
5,568,336 A * 10/1996 Jolivet .................... 360/114.07
5,586,101 A * 12/1996 Gage et al. .............. 369/13.32
5,790,501 A    8/1998 Nishikawa et al.
5,961,848 A   10/1999 Jacquet et al.
6,538,968 B1 * 3/2003 Yamaguchi et al. ...... 369/47.53

FOREIGN PATENT DOCUMENTS

| EP | 0 372 881 | 6/1990 |
| EP | 0 380 329 | 8/1990 |
| EP | 0 439 383 | 7/1991 |
| EP | 0 468 800 | 1/1992 |
| EP | 0 557 212 | 8/1993 |
| EP | 0 611 202 | 8/1994 |
| FR | 2 696 037 | 3/1994 |
| FR | 2 699 724 | 6/1994 |

* cited by examiner

Primary Examiner—Tan Dinh
(74) Attorney, Agent, or Firm—Oblon, Spivak, McClelland, Maier & Neustadt, P.C.

(57) ABSTRACT

A magnetooptic read device in which the figure of merit is optimized mainly by the setting of the incident light polarizer. The component of the incident wave pumps the magnetooptic transducer. The component of the incident wave amplifies the variations in the magnetooptic wave and generates a reflected wave of approximately linear polarization.

11 Claims, 2 Drawing Sheets

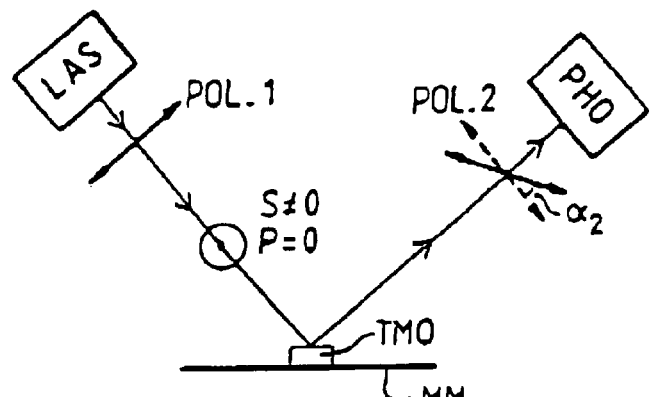
FIG.1
BACKGROUND ART
FIG.2
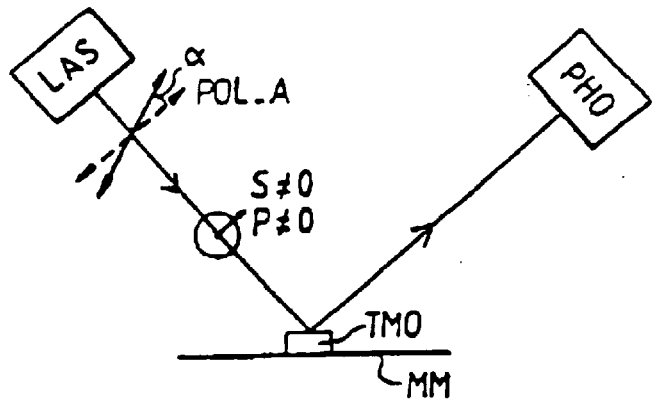
FIG.2.1
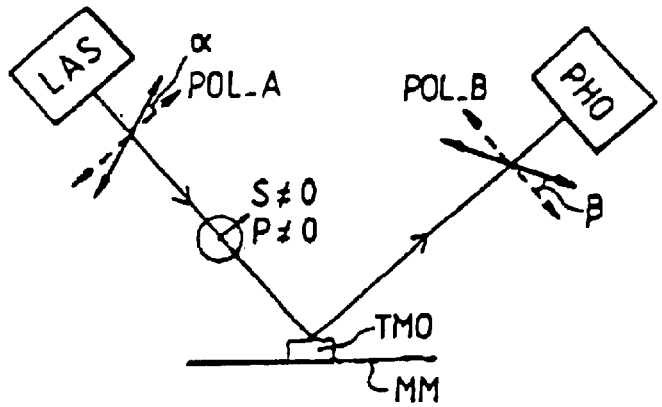
FIG.2.2

MAGNETO-OPTICAL READER WHICH IS OPTIMIZED BY THE INCIDENT-LIGHT POLARISER

BACKGROUND OF THE INVENTION

The present invention relates to magnetooptic readers.

DISCUSSION OF THE BACKGROUND

Magnetooptic readers make use of the Kerr effect or the Faraday effect. In the first case, to which the present invention relates, the induced polarization variations are measured on polarized light after reflection off a medium whose magnetization variations represent prerecorded information.

The choice of the nature and of the geometry of the various layers of the read transducer makes it possible to maximize the amplitude of the magnetooptic component to be read. However, it is observed that, when this optimum is reached, the phase shift between the read signal and the signal to be read is equal to $\pi/2$. The polarization of the signal is said to be elliptical. In total, the magnetooptic signal cannot be read under these conditions. For this type of device, the common practice is to estimate the signal-to-Schottky noise ratio by a quantity which represents it, called the figure of merit (or FM). The figure of merit depends, under conditions explained in the detailed description, on various quantities which are not simultaneously optimal for a given polarization of the incident beam. In structures optimized for the amplitude of the magnetooptic component, the figure of merit will be zero if no modification is made to the device.

The prior art, the limitations of which it is the object of the present invention to overcome, is represented especially by French patents No. 2 569 072, 2 656 723, 2 657 190, 2 680 268, 2 696 037 and 2 701 332.

In these devices of the prior art, two solutions are envisioned for maximizing the figure of merit. The first solution consists in placing a $\lambda/2$ plate in the path of the incident beam so as to convert the polarization of the incident beam while maintaining the orientation of the image of the light source focussed onto the read pole. The second solution consists in placing a birefringent plate in the path of the reflected beam so as to linearize the polarization of the reflected beam. Both these solutions are expensive in terms of components, adjustments and size, and thereby counter to the desired objectives of reducing cost and size in information storage systems.

SUMMARY OF THE INVENTION

The present invention makes it possible to achieve the desired optimizations without an additional component, or even with fewer components than the prior art.

For these purposes, the invention provides a magnetooptic read device of the type comprising a magnetooptic transducer designed to cooperate with a magnetized medium to be read, a light source for applying, through an upstream polarizer, an excitation beam to the magnetooptic transducer, and a photodetection unit lying on the optical path of the reflected beam coming from the magnetooptic transducer in order to deliver an electrical read signal, in which the magnetooptic transducer produces, in response to the excitation beam, a reflected beam which comprises, on the one hand, a reflected part of the excitation beam and, on the other hand, owing to the effect of a principal component (S) of the electric field of the incident wave, a magnetooptic component containing the read information, characterized in that the upstream polarizer is set so as to let through both the principal component (S) and its orthogonal component (P) with a lower amplitude, the latter interacting with the magnetooptic transducer in order to improve the amplitude/phase state of the magnetooptic component of the beam applied to the photodetection unit.

In a variant of the invention, the device furthermore includes a second polarizer placed in the path of the reflected beam, the two polarizers being set jointly to improve the amplitude/phase state of the magnetooptic component of the beam applied to the photodetector.

In another variant of the invention, the device furthermore includes a second polarizer in the path of the reflected beam, this second polarizer being set to adjust the amplitude of the beam applied to the photodetector below the saturation threshold of the latter.

DESCRIPTION OF THE FIGURES

The invention will be more clearly understood and its various features and advantages will become apparent from the description which follows of an illustrative example and from its appended figures in which:

FIG. 1 shows the basic principle of a device of the prior art;

FIG. 2 including FIGS. 2-1, 2-2, shows the basic principle of a device according to the invention in a preferred embodiment and in a variant.

DESCRIPTION OF THE PREFERRED EMBODIMENTS

Figure 3:
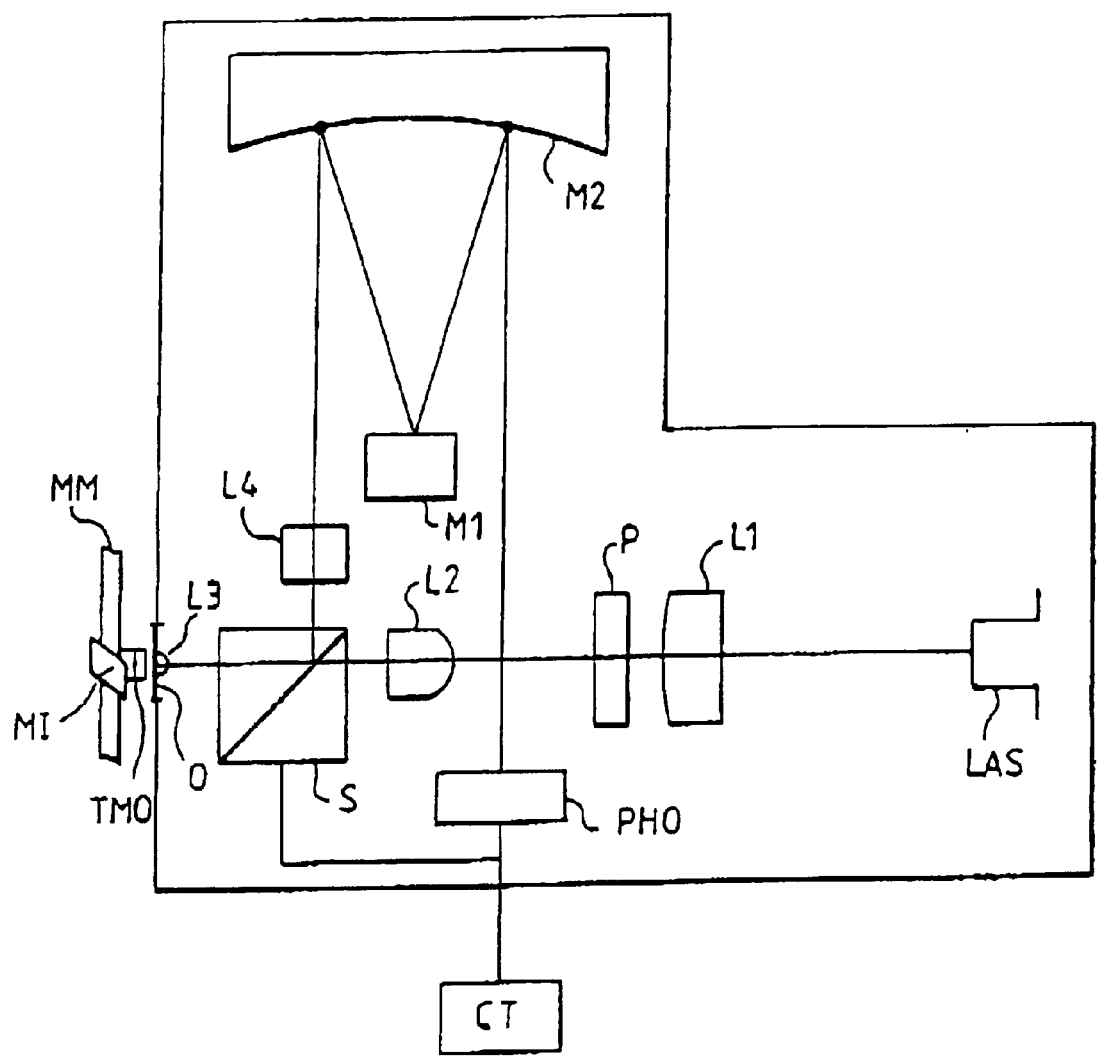
FIG. 3 shows the construction of a device according to the invention in a preferred embodiment.

A simplified basic diagram of the devices of the prior art is given in FIG. 1, in which LAS is a light source, POL-1 is a first polarizer, TMO is a magnetooptic transducer, MM is a magnetized medium, POL-2 is a second polarizer and PHO is a photodetector. The polarization of a light beam is conventionally analyzed by the projection of the electric field vector E in the specific reference frame formed by the component P, lying in the plane of analysis and normal to the direction of propagation, and by the component S, normal to the plane of incidence and normal to the direction of propagation. The polarization component S is therefore perpendicular to the plane of the figure. The polarizer POL-1 is set so that the component P (which in the plane of the figure would be orthogonal to the incident beam) is zero.

The figure of merit depends especially on a quantity $T_r$, the value of which depends on the dimensions of the laser beam at the focal point and on the extent of that region of the read pole of the magnetooptic transducer which is excited by the magnetic bits written on the tape. $T_r$ is a maximum when the largest dimension of the incident light beam is parallel to the read edge, (i.e.: the line of contact between the magnetooptic transducer and the magnetic medium), this being obtained for S-polarized light, the largest dimension of the light beam being collinear with the electric field.

However, the figure of merit also depends on an amplification coefficient $T_c$ of the magnetooptic signal, the value of which depends on the amount of light absorbed by the magnetooptic medium constituting the read pole. However, optimization of the coupling between the incident beam and the read pole is accompanied by a change in the state of polarization of the reflected beam. Thus, for optimum coupling, the incident light of polarization S is reflected in a completely elliptical polarization state, that is to say the principal component S and the magnetooptic component oscillate in phase opposition; there therefore cannot be any pumping of the magnetooptic component by the S component of the reflected field since, when the electric field in the S state is a maximum, the electric field of the magnetooptic component is zero and vice versa. The figure of merit is then zero. This change in the state of polarization of the reflected beam does not take place for an incident polarization P. The principal component P and the magnetooptic component oscillate in phase.

In the prior art, $T_r$ and $T_c$ are therefore optimized for opposed values of the polarization of the principal component. The invention consists in using the advantages of the two polarizations.

FIG. 2.1 shows the basic principle of a magnetooptic read device according to the invention. A light source (LAS) emits light toward a polarizer (POL-A) which is set with an angle of polarization ($\alpha$) so as to let through a component S perpendicular to the plane of the figure and a component P lying in the plane of the figure, perpendicular to the laser beam and of smaller amplitude than that of the component S.

The interactions between the incident wave, polarized in the manner that has just been described, and the magnetooptic transducer (TMO) will then be the following:

as in the prior art, the component S is used to illuminate, so as to optimize the figure of merit, that region of the read pole magnetized by the magnetized medium (MM). This component magnetooptically excites the transducer, generating a magnetooptic component of maximum amplitude when the degree of coupling $T_c$ is optimal, most (>95%) of the incident optical power being concentrated in the polarization S;

unlike the prior art, it is the component P which amplifies the magnetooptic component, by interfering with the latter, generating a reflected beam in P in which these two components are approximately in phase. It is thus possible in structures in which the degree of coupling $T_c$ has been optimized, to have a good degree of overlap $T_r$ (obtained with the incident part of the beam of polarization S) and to use, in the reflected beam, an electromagnetic wave whose amplification component P and magnetooptic component are in phase.

Furthermore, the reflection coefficient of the magnetooptic transducer (TMO) is chosen so that the intensity of the reflected wave is less than the saturation threshold of the photodetector (PHO), thereby making it possible to eliminate the second polarizer (POL-2) of the prior art, the function of which was especially to keep the intensity of the signal transmitted to the photodetector at a level below the saturation threshold of the latter.

However, cases may exist in which:

the reflected wave has an intensity above the saturation threshold of the photodetector; and the setting range $\alpha$ of the polarizer (POL-A) is insufficient to allow the figure of merit to be optimized.

In both these cases, the device according to the invention will include, as shown in FIG. 2.2, a second polarizer (POL-B) of setting angle $\beta$ which:

in the first case, will serve only to attenuate the intensity of the reflected beam to a level below the saturation threshold of the photodetector; and in the second case, will be set jointly with the first polarizer (POL-A) to optimize the figure of merit.

In the configuration of the prior art as shown by FIG. 1, the figure of merit (FM) is given by the following approximate formula:

$$FM \sim T_r T_c r_{sCT} os(\epsilon_s) \cos(\alpha_2)$$

where $T_r$ and $T_c$ have the meanings indicated above, $\alpha_2$ is the setting angle of the polarizer POL-2, $\epsilon_s$ is the ellipticity of the reflected beam, that is to say the phase shift between the principal component (in this case S) and the magnetooptic component induced by the reflection and the interactions in the transducer, and $r_{sp}$ is the amplitude magnetooptic reflection coefficient generated during interaction of the incident beam with the magnetooptic medium. This coefficient is that of a layer placed in air and with a thickness very much greater than the skin depth. It is proportional to the amount of light absorbed by the medium.

It will be noted that the optimization of $T_c$ by a judicious choice of the layers of the transducer results in a value of $\epsilon_s$ close to $\pi/2$, i.e. a value of the figure of merit close to zero.

In the configuration according to the invention, as shown by FIGS. 2.1 and 2.2, the figure of merit is given by the following approximate formula:

$$FM \sim T_r T_c r_{sCT} os(\epsilon_p) \cos^2(\alpha)$$

where $\epsilon_p$ is the ellipticity of the reflected beam received by the photodetector when the incident beam has a small polarization P. $\alpha$ is the polarization angle set on the polarizer POL-A.

The quadratic dependence on the polarization angle is introduced by the fact that the projection base itself effects a rotation through the angle of polarization. $\epsilon_p$ is close to zero.

The dependence of the figure of merit on $\epsilon_p$, and not on $\epsilon_s$, ensures that the ellipticity is eliminated and therefore that the figure of merit is improved, all other things being equal.

FIG. 3 shows an illustrative example of a magnetooptic read device according to the invention. In this figure, the symbols have the meanings mentioned above or indicated below:

L1, L2, L3 and L4 are focussing lenses or astigmatism-correcting lenses;

S is an optical splitter letting the incident beam through and reflecting the reflected beam at 135°;

O is an aperture made in the casing of an L shape of the device; and

M1 and M2 are two mirrors, respectively convex and concave, at least one of which may be controlled by a signal taken off the photodetector.

This embodiment makes it possible both to ensure that the incident beam is focussed onto the magnetooptic transducer and to maintain the position of the reflected beam with respect to the photodetector despite the positional variations of the magnetic medium with respect to the transducer, said variations being compensated for by the control signal output by the processing circuit (CT).

Unlike the prior art, the device according to the invention does not include in its preferred embodiment a second polarizer in the path of the reflected beam, without this modifying the operation of the various abovementioned optical elements.

A high-frequency magnetic field inductor (MI) will advantageously be placed near the read region so as to create a field parallel to the magnetized medium (MM) which will stabilize the magnetic domains of the magnetic medium and of the magnetooptic transducer (TMO), thus appreciably improving the signal-to-noise ratio and the figure of merit.

The light source may be replaced with a number of sources organized in a linear array perpendicular to the plane of FIG. 2.1.

The photodetector may be a CCD (Charge Coupled Device) sensor or, preferably, a CMOS sensor whose saturation threshold is higher.

What is claimed is:

1. A magnetooptic read device comprising:

a magnetooptic transducer configured to cooperate with a magnetized medium to be read;

a light source configured to apply, through an upstream first polarizer, an excitation beam to the magnetooptic transducer; and a photodetector lying on an optical path of a reflected beam coming from the magnetooptic transducer to deliver an electrical read signal, in which the magnetooptic transducer produces, in response to the excitation beam, the reflected beam that includes a reflected part of the excitation beam and, owing to an effect of a principal component of an electric field of an incident wave, a magnetooptic component containing the read information;

wherein the first polarizer is configured to let through both the principal component and its orthogonal component, the orthogonal component having a lower amplitude than an amplitude of the principal component.

2. The device as claimed in claim 1, further comprising a second polarizer placed in the optical path of the reflected beam.

3. The device as claimed in claim 1, further comprising a second polarizer placed in the optical path of the reflected beam, and wherein the second polarizer is configured to adjust an amplitude of the excitation beam applied to the photodetector below a saturation threshold of the photodetector.

4. The device as claimed in claim 1, further comprising:

a processing circuit receiving as an input an electrical current output by the photodetector and producing as an output (1) a signal representative of variations in a variable magnetic field and (2) a control signal; and at least one optical element positioned between the magnetooptic transducer and the photodetector, and configured to be adjusted according to the control signal to adjust the optical path of the excitation beam applied to the photodetector.

5. The device as claimed in claim 4, further comprising a second polarizer placed in the optical path of the reflected beam.

6. The device as claimed in claim 4, further comprising a second polarizer placed in the optical path of the reflected beam, and wherein the second polarizer is configured to adjust an amplitude of the excitation beam applied to the photodetector below a saturation threshold of the photodetector.

7. The device as claimed in claim 5, wherein the at least one optical component is placed between the magnetooptic transducer and the second polarizer.

8. The device as claimed in claim 6, wherein the at least one optical component is placed between the magnetooptic transducer and the second polarizer.

9. The device as claimed in claim 1, further comprising, in at least one of a path of the excitation beam and the optical path of the reflected beam, one or more optical focussing and astigmatism-correcting elements.

10. The device as claimed in claim 1, further comprising a high-frequency magnetic field inductor near the magnetooptic transducer.

11. The device as claimed in claim 1, wherein the polarizer is set to give an approximately linear polarization to the beam applied to the photodetector.

* * * * *